(12) United States Patent
Smith (10) Patent No.: US 7,904,362 B1
(45) Date of Patent: *Mar. 8, 2011

(54) SYSTEMS AND METHODS FOR IMPLEMENTING A FINANCIAL PLAN WITH REGARD TO EXPENSES

(75) Inventor: Arthur Quentin Smith, Fredericksburg, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/935,801

(22) Filed: Nov. 6, 2007

(51) Int. Cl.
*G06Q 40/00* (2006.01)

(52) U.S. Cl. ............... 705/35; 705/40; 705/7; 235/379; 707/687; 706/46

(58) Field of Classification Search ............... 705/14; 235/380; 706/46
See application file for complete search history.

(56) References Cited

U.S. PATENT DOCUMENTS

| | | | | |
|---|---|---|---|---|
| 5,644,727 A * | 7/1997 | Atkins | ............... | 705/40 |
| 5,987,433 A * | 11/1999 | Crapo | ............... | 705/36 R |
| 6,012,043 A * | 1/2000 | Albright et al. | ............... | 705/36 R |
| 6,253,192 B1 * | 6/2001 | Corlett et al. | ............... | 705/36 R |
| 6,430,542 B1 * | 8/2002 | Moran | ............... | 705/36 R |
| 6,449,661 B1 * | 9/2002 | Fujishima | ............... | 710/5 |
| 6,868,413 B1 | 3/2005 | Grindrod et al. | | |
| 6,985,880 B1 * | 1/2006 | Hodgdon et al. | ............... | 705/36 T |
| 7,089,306 B2 * | 8/2006 | Thorpe et al. | ............... | 709/224 |
| 7,089,491 B2 * | 8/2006 | Feinberg et al. | ............... | 715/234 |
| 7,099,843 B1 * | 8/2006 | Cassidy et al. | ............... | 705/38 |
| 7,177,831 B1 * | 2/2007 | O'Shaughnessy et al. | . | 705/36 R |
| 7,325,201 B2 * | 1/2008 | Ferrari et al. | ............... | 715/737 |
| 7,461,021 B2 * | 12/2008 | Bergmann et al. | ............... | 705/36 T |
| 7,467,109 B1 * | 12/2008 | Simon et al. | ............... | 705/36 R |
| 7,509,279 B2 * | 3/2009 | Chhabra et al. | ............... | 705/36 R |
| 7,542,921 B1 * | 6/2009 | Hildreth | ............... | 705/26 |
| 7,577,597 B1 * | 8/2009 | Allison et al. | ............... | 705/35 |
| 2002/0087447 A1 * | 7/2002 | McDonald et al. | ............... | 705/36 |
| 2002/0091610 A1 * | 7/2002 | Smith | ............... | 705/36 |
| 2002/0099834 A1 * | 7/2002 | Sielaff et al. | ............... | 709/228 |
| 2002/0174058 A1 * | 11/2002 | Baghdady | ............... | 705/37 |

(Continued)

OTHER PUBLICATIONS

EISI; "Software that supports growth"; downloaded Nov. 1, 2007; http://www.eisi.com/products/index.htm; p. 1; Copyright 2007 Emerging Information Systems, Inc.

(Continued)

*Primary Examiner* — Ella Colbert
*Assistant Examiner* — Chika Ojiaku
(74) *Attorney, Agent, or Firm* — Perkins Coie LLP (57) ABSTRACT

A person has expenses to be paid according to a financial plan which identifies liquidating procedures for liquidating investments to generate funds for the person, where the funds are for paying the expenses. To implement the financial plan for the person, the financial plan is received at a plan defining module which produces based thereon a formatted list of sequentially applied liquidation rules. A plan implementation module is actuated upon a triggering event, after which the formatted list of rules is received at the actuated plan implementation module. The actuated plan implementation module applies the received list of rules to liquidate investments of the person and thereby generate the funds for the person.

24 Claims, 3 Drawing Sheets

U.S. PATENT DOCUMENTS

| | | | |
|---|---|---|---|
| 2003/0097324 A1* | 5/2003 | Speckman | 705/36 |
| 2003/0167224 A1* | 9/2003 | Periwal | 705/37 |
| 2004/0068468 A1* | 4/2004 | North | 705/39 |
| 2005/0080699 A1 | 4/2005 | Snelling | |
| 2005/0154658 A1* | 7/2005 | Bove et al. | 705/35 |
| 2005/0197947 A1* | 9/2005 | Tyson | 705/36 |
| 2006/0143055 A1* | 6/2006 | Loy et al. | 705/4 |
| 2006/0212376 A1* | 9/2006 | Snyder et al. | 705/35 |
| 2007/0244777 A1 | 10/2007 | Torre et al. | |
| 2007/0250427 A1 | 10/2007 | Robinson | |
| 2008/0059323 A1* | 3/2008 | Chang et al. | 705/26 |
| 2008/0147570 A1 | 6/2008 | Torre et al. | |
| 2009/0070275 A1* | 3/2009 | Frank et al. | 705/36 T |

OTHER PUBLICATIONS

PC Magazine; "Definition of: financial planning system"; downloaded Nov. 1, 2007; http://www.pcmag.com/encyclopedia_/0,2542,t=financial+planning+system&i=43204,00.asp; pp. 1-4; Copyright © 1981-2007 The Computer Language Company Inc.

FPS Plans; "Summary Screen"; downloaded Nov. 1, 2007; http://fpsplans.com/assets/images/software_include/summary_760x620.jpg; Copyright 2005 FPS LLC.

Njaes; "Financial Planning and Investigating Glossary"; downloaded Nov. 1, 2007; http://njaes.rutgers.edu/money/glossary.asp; Copyright 2007 Rutgers, The University of New Jersey.

* cited by examiner

SYSTEMS AND METHODS FOR IMPLEMENTING A FINANCIAL PLAN WITH REGARD TO EXPENSES

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 11/935,810;
U.S. patent application Ser. No. 11/935,181;
U.S. patent application Ser. No. 11/935,844;
U.S. patent application Ser. No. 11/935,859; and
U.S. patent application Ser. No. 11/935,864.

FIELD

The present disclosure is directed to systems and methods that assist with implementing a financial plan for a person or other entity (hereinafter, 'person') that has had such a financial plan. More particularly, the present disclosure is directed to such systems and methods that in response to being presented with an expense of the person automatically obtain funds from among multiple investment instruments/products/vehicles or other fund sources in accordance with the financial plan of the person.

BACKGROUND

As is generally known, a financial planner or the like may produce a financial plan for a client thereof, be it an individual, a married couple, a corporation or other organization, any other person, or the like (hereinafter, 'person'). Alternatively, the person may produce the financial plan itself or may amend or otherwise alter an already-produced financial plan. In any of the aforementioned situations, it is to be appreciated that the financial plan can include a budget, a plan for spending funds, a plan for saving funds, and/or a plan for saving income. Typically, and with regard to various types of expenses such as rent, utilities, and the like, such a financial plan may specify how such expenses are to be paid, either with income from the person, income generated by investment instruments of the person, funds generated by liquidating such investment instruments, or even with funds obtained through loans, lines of credit, credit sources, and the like. As should be understood, the investment instruments referred to and employed by a financial plan may be most any investment instruments, such as stocks, bonds, certificates of deposit, mutual funds, savings accounts, rainy-day funds, and the like.

Notably, achieving financial goals in general requires not only producing a financial plan, but actually implementing the produced financial plan. That is, it is not enough merely to have a financial plan; instead, the person for whom the financial plan was produced must effectively take steps as set forth in the financial plan. Thus, if a financial plan for a person requires that the person pay expenses from income or funds (hereinafter, 'funds') derived from one or more particular sources, then the person should in fact pay the expenses with funds derived from such sources. Similarly, if the financial plan requires that a certain investment instrument should be liquidated at a particular time, then the person should in fact do so.

Of course, producing a financial plan and actually implementing the produced financial plan are different matters, especially when it is considered that finances in general can be highly complicated and highly subject to the vagaries of time and circumstances. Even with the best of intentions, a financial plan can go astray. People make many spontaneous decisions about purchasing items and the mechanism for making payments for such purchases. In doing so, such people often make poor decisions. In addition, when multiple persons are using the same assets (i.e., accounts, cash, credit cards, etc.) each of such multiple persons is often unaware of decisions made by the other or others, be they spouses, parents, children, or the like.

Thus, and to generalize, situations can arise where the financial plan assumes a set amount of expenses each month paid from funds derived from certain sources, and for whatever reason the actual expenses for the person are different, perhaps by being greater or less than the assumed expenses. Perhaps more relevant to the present disclosure, however, is that most persons simply do not follow the financial plan by deriving the funds from the sources specified according to such financial plan. That is, most persons do not have the discipline necessary to determine the proper source for funds and liquidate such funds from same. Instead, most persons obtain funds for expenses from whatever source is most expedient and without forethought. For one example, a person may choose to accumulate debt to obtain the funds, perhaps by way of a credit account or the like, simply because such credit account is easily accessible, and even though it would be more prudent according to a financial plan for the person to liquidate an investment such as shares of a stock. In another example, a person may choose to obtain the funds for an expense from such shares of stock, even though such person has a retirement account from which funds must be withdrawn according to the rules of such account.

Accordingly, a need exists for systems and methods for implementing a financial plan with regard to expenses of a person. In particular, a need exists for such systems and methods that automatically generate funds from appropriate sources in response to expenses of a person to which such funds are to be applied and based on a produced financial plan. Generally, such generation of funds is performed according to a series of sequentially applied rules that are derived based on the produced financial plan. Thus, with such systems and methods, the financial plan produced for a person is carried out and the objectives of the person and the financial plan thereof are more likely to be achieved.

SUMMARY

The aforementioned needs are satisfied at least in part by a system and method with regard to a financial plan for a person having expenses to be paid according to the financial plan. The financial plan identifies liquidating procedures for liquidating investments to generate funds for the person, where the funds are for paying the expenses.

To implement the financial plan for the person, the financial plan is received at a plan defining module which produces based thereon a formatted list of sequentially applied liquidation rules. A plan implementation module is actuated upon a triggering event, after which the formatted list of rules is received at the actuated plan implementation module. The actuated plan implementation module applies the received list of rules to liquidate investments of the person and thereby generate the funds for the person.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which are presently preferred. As should be understood, however, the embodiments of the present invention are not limited to the precise arrangements and instrumentalities shown. In the drawings.

DETAILED DESCRIPTION

Example Computing Environment

Figure 1:
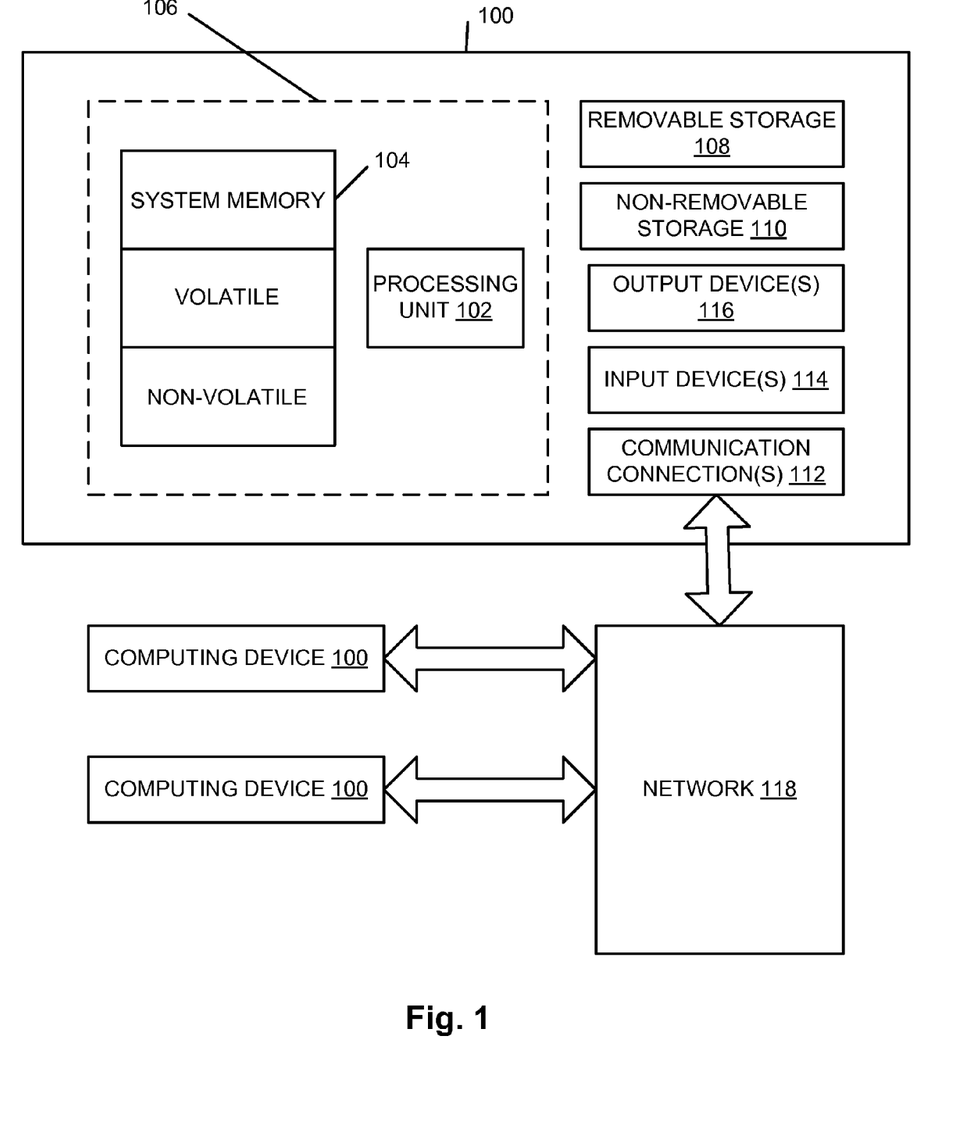
FIG. 1 is a block diagram of an example of a computing environment within which various embodiments of the present invention may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Financial Planning

Figure 2:
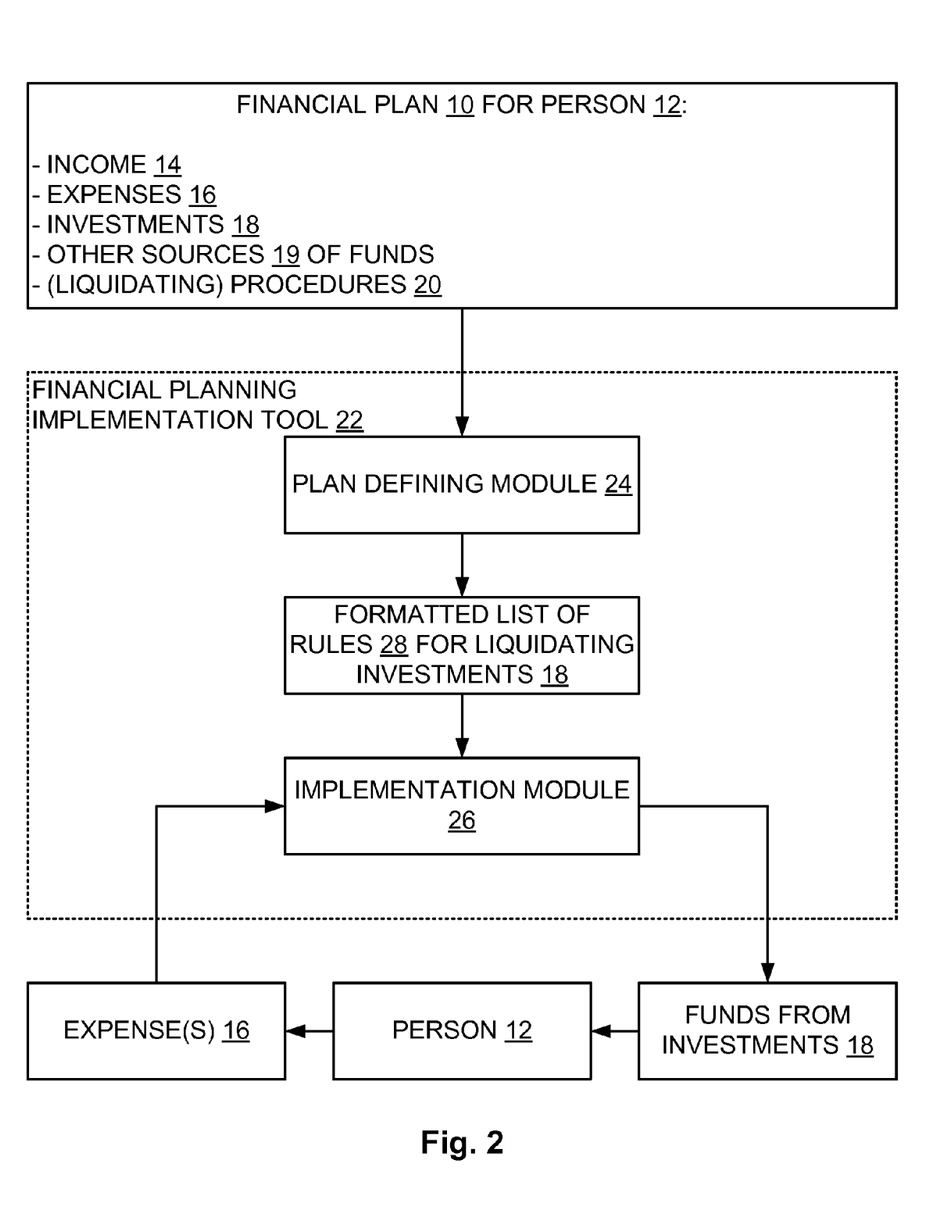
FIG. 2 is a block diagram of a system for implementing a financial plan with regard to expenses in accordance with various embodiments of the present invention.

As was set forth above, and turning now to FIG. 2, a financial planner or the like may produce a financial plan 10 for a client thereof, be it an individual, a married couple, a corporation or other organization, any other person, or the like (hereinafter, 'person 12'). Alternatively, the person 12 may produce the financial plan 10 itself or may amend or otherwise alter an already-produced financial plan 10. Generally, the financial plan 10 may be organized into portions that respectively identify sources of income 14 for the person 12, expenses 16 of the person 12, a set of investment instruments (hereinafter, 'investments 18') and allotments thereof for investing the income 14 for the person 12, and a set of liquidating procedures 20 for liquidating investments 18 and otherwise obtaining funds as necessary to pay the expenses 16 of the person 12.

However, and with respect to the various embodiments of the present invention, it is to be appreciated that the financial plan 10 can take any appropriate form without departing from the spirit and scope of the present invention. For example, the financial plan 10 may focus on the expenses 16 of the person 12 only, and not the income 14 thereof, in which case the investments 18 and allotments thereof for investing the income 14 are likely not necessary. Conversely, the financial plan 10 may focus on the income 14 of the person 12 only, and not the expenses 16 thereof, in which case the liquidating procedures 20 are not particularly important.

Notably, the expenses 16 of the person 12 that are the basis of a financial plan 10 may be any expenses without departing from the spirit and scope of the present invention. For example, the expenses 16 of the person 12 may include rent, vehicle payments, property payments including mortgages and/or related dues and fees, taxes due, utilities, recurring and one-time gifts from the person 12, settlements owed, or any other form of value owed by the person 12, particularly but not necessarily in a cash form.

Also notably, the investments 18 and allotments thereof by which income 14 for the person 12 has been invested and as set forth in the financial plan 10 can be any investments 18 and allotments without departing from the spirit and scope of the present invention, and can be quite detailed. Thus, it may be that the investments 18 are broken down into multiple groupings, and that with regard to each grouping certain liquidating procedures 20 may be set forth in the financial plan 10. For example, the financial plan 10 may identify short-term, medium-term, and long-term investments 18, where such short-term investments 18 are a savings account or a certificate of deposit with a term of less than a year or the like, such medium-term investments 18 are a stock or a bond or a certificate of deposit with a term greater than a year or the like, and such long-term investments 18 are a mutual fund or a government treasury bill or the like.

In addition, the financial plan 10 may identify other sources 19 of funds to pay expenses 16 of the person 12. For example, such other sources 19 may include income 14 paid by an employer of the person 12 if in fact the person 12 is employed. Additionally, such other sources 19 may include various sources of credit available to the person 12, including credit from a credit account or a line of credit, be it secured or unsecured. Note, though, that obtaining funds from a source 19 such as a credit account involves additional considerations, including but not limited to the cost of such credit, as well as the fact that the obtained funds from the credit sources 19 must eventually be paid back. Despite such additional considerations, such credit sources 19 should be considered as part of a financial plan 10, especially if there are costs associated with liquidating other investments 18 of the person 12, and more especially if the costs of liquidating the investments 18 are greater than the costs of the credit.

Note that in considering the expenses 16 of a person 12 in connection with a financial plan 10 therefore, it may be useful to categorize such expenses 16 as individual expenses 16 that are dealt with as each such individual expense 16 arises, such as for example the purchase of a new vehicle, or collective expenses 16 that are dealt with in a collective manner, such as for example groceries and credit card bills. Furthermore, such expenses 16 may be recurring expenses 16, such as for example monthly mortgage payments or quarterly water bills, or one-time non-recurring expenses 16, such as the purchase of a paid-up life insurance policy. At any rate, the financial plan 10 may deal with generating funds to pay each type of expense 16 in any appropriate manner without departing from the spirit and scope of the present invention.

Thus, it may be that according to the financial plan 10 for a person 12, funds are generated to pay expenses 16 in at least two ways, depending on whether the expense 16 is a recurring expense 16 or a one-time non-recurring expense 16. For recurring expenses 16, which are generally more predictable, it may be that the financial plan 10 generates a set amount of funds one each month to pay all of such recurring expenses for that month, and according to a set of liquidating procedures 20. However, for non-recurring expenses 16, which are generally less predictable, it may be that the financial plan 10 generates a set amount of funds upon presentment of each such non-recurring expense 16, here too according to a set of liquidating procedures 20.

Note here that the liquidating procedures 20 for each type of expense 16 may be the same or different, and otherwise may generally be any appropriate liquidating procedures 20 without departing from the spirit and scope of the present invention. Note that such procedures 20 may take into consideration many factors, including taxes, rules for providing funds for at least some of the investments 18 of the person 12 and the other sources 19 of funds of the person, financial goals of the person 12, costs incumbent in liquidating investments 18 and otherwise obtaining funds from the other sources 19, and the like. For example, in one set of liquidating procedures 20 for a financial plan 10, funds may be generated from different types of investments 18 and other sources 19 in the following manner:

Firstly according to the financial plan 10, a set amount of the funds is generated to pay an expense or expenses 16 by liquidating long-term investments 18, and in particular that 60 percent of the set amount is to be generated from mutual funds of the person 12 and that the remaining 40 percent is to be generated from long-term bonds of the person. Likewise, it may be that, secondly according to the financial plan 10, if additional funds are needed, a set percentage of the remaining funds (if any) is to be generated by liquidating medium-term investments 18, and in particular that the amount derived from the set percentage is to be generated from a predetermined number of stocks and bonds in predetermined percentage allotments. Similarly, it may be that, thirdly according to the financial plan 10, the other part of the remaining funds (if any) is to be generated by liquidating short-term investments 18 and by taking funds from a line of credit, and in particular that half of the funds are withdrawn from a savings account and the other half from the line of credit.

Of course, and as was pointed out above, a financial plan 10 upon being produced should also be implemented. However, the person 12 for whom the financial plan 10 was produced may not in fact implement same, especially in a manner that maintains fidelity to the financial plan 10. Especially when it is considered that the financial plan 10 can be complicated, and at any rate may require considerable effort on the part of the person 12 for whom the plan 10 was produced, it is not altogether surprising that the financial plan 10 can go astray. The person 12 may make spontaneous decisions about purchasing items and concurrently may not take the time to generate funds to pay for the purchased item according to the financial plan 10. Likewise, the person 12 may be busy or otherwise occupied or may simply lack the discipline and thus not follow the instructions set forth in the financial plan 10. Moreover, a person 12 may be faithful to the financial plan 10 for some period of time and then may falter for any of a variety of reasons, after which the person 12 may decide to ignore the financial plan 10.

Financial Plan Implementation Tool

Accordingly, in various embodiments of the present invention, a financial plan implementation tool 22 is provided to effectuate implementation of a produced financial plan 10 with regard to expenses 16. It is to be appreciated that such a tool 22 is typically computer-based, and therefore may be implemented on a computing device 100 such as that set forth above in connection with FIG. 1. Notably, such a computing device 100 may be any appropriate computing device without departing from the spirit and scope of the present invention. For example, the computing device 100 may be a single personal-type computer or may be an industrial or high-capacity computing system or network of computers or the like if need be.

Generally, the tool 22 includes a plan defining module 24 for receiving the financial plan 10 for a person 12, and also for allowing the received financial plan 10 to be updated and/or revised as necessary, and a plan implementation module 26 for implementing the received plan 10 for the person 12 based on income 14 received by or on behalf of such person 12. The tool 22 may be operated independent of any particular financial institution, although it is to be expected that a particular financial institution may offer the tool 22 to customers thereof at least partially in an effort to convince such customers to employ additional services of the financial institution, as well as to ensure that more business of the customers remains with the financial institution.

The plan defining module 24 of the tool 22 may either receive the financial plan 10 as produced and/or revised elsewhere, or may be employed to produce/revise such plan 10. In any instance, producing and/or revising the plan 10 is generally known or should be apparent to the relevant public, and therefore need not be set forth herein in any detail except that which is provided. At any rate, the plan 10 may be any appropriate plan without departing from the spirit and scope of the present invention. Notably, the plan 10 as produced or revised, and particularly the set of liquidating procedures 20 for generating funds to pay for any particular kind of expense 16 for the person 12, may be formulated as a list of sequentially applied rules 28, and the plan defining module 24 produces such a list of rules 28 as an output based on the plan 10.

Note here, that the list of rules 28 as output by the plan defining module 24 may be any appropriate rules and take any appropriate form without departing from the spirit and scope of the present invention. Thus, the list of rules 28 may be set forth as an eXtensible Markup Language (XML) document that sets forth the rules 28 as a series of conditional steps. For example, assuming that (1) the financial plan 10 that is input to the tool 22 is the financial plan 10 set forth above and (2) that the implementation of the rules 28 with regard to a particular type of expense 16 occurs once a month at the beginning thereof, the firstly applied rule 28 in the list is that a set amount X of the funds is generated to pay the expense or expenses 16 by liquidating long-term investments 18, and in particular that 60 percent of the set amount is to be generated from mutual funds of the person 12 and that the remaining 40 percent is to be generated from long-term bonds of the person. Such first rule 28 in a pseudo-code may appear firstly in the list as:

VALUE=X
IF VALUE LESS THAN [expenses 16] THEN VALUE= [expenses 16]
LIQUIDATE 0.6*VALUE OF [mutual funds of person 12]
LIQUIDATE 0.4*VALUE OF [long-term bonds of person 12]
REMAINDER=[expenses 16]−VALUE Likewise, the secondly applied rule 28 in the list is that a set percentage Y of the remaining funds (if any) is to be generated by liquidating medium-term investments 18, and in particular that the amount derived from the set percentage is to be generated from a predetermined number of stocks and bonds in predetermined percentage allotments. Such second rule 28 in a pseudo-code may appear secondly in the list as:

IF REMAINDER=0 THEN END
VALUE=Y*REMAINDER/100
LIQUIDATE [percentage of VALUE] OF [stock or bond]
LIQUIDATE [percentage of VALUE] OF [stock or bond]
LIQUIDATE [percentage of VALUE] OF [stock or bond]
LIQUIDATE [percentage of VALUE] OF [stock or bond]
|
REMAINDER=REMAINDER−VALUE Finally, the thirdly applied rule 28 in the list is that the other part of the remaining funds (if any) is to be generated by liquidating short-term investments 18 and by taking funds from a line of credit, and in particular that half of the funds are withdrawn from a savings account and the other half from the line of credit. Such third rule 28 in a pseudo-code may appear thirdly in the list as:

IF REMAINDER=0 THEN END
VALUE=REMAINDER
OBTAIN 0.5*VALUE FROM [savings account of person 12]
OBTAIN 0.5*VALUE FROM [line of credit of person 12]
END Although by no means comprehensive, it may be observed that rules 28 may generally be of the following types: spill-over, where an amount of funds is generated from one or more investments 18, and any remainder is left to be generated by a subsequent rule 28; splits, where an amount of funds is generated from among several investments 18, perhaps on a percentage basis; conditional, where an amount of funds is generated from one or more investments 18, but only if a condition is met; and fixed amount, where the amount of funds generated a specific amount. Of course, rules 28 may be combinations of such types, such as for example conditional-fixed, where a specific amount of funds is generated from one or more investments 18, but only if a condition is met.

It is to be noted here that although the rules 28 have thus far been disclosed as being employed to determine how to generate funds, such rules 28 may also be employed to determine how to pay expenses 16. Thus, it may be that the rules 28 are employed to determine that a particular day of the month, that one particular current expense 16 is to be paid before another particular current expense 16 is to be paid, that a particular expense 16 is to be paid only from funds generated from a particular source, etc.

Moreover, the rules 28 may specify longer-term policies for paying particular expense 16. For example, if the person 12 is a retiree looking to minimize expenses 16, the rules 28 may specify that one credit account having a balance with a higher interest rate is to be paid before another credit account having a balance with a lower interest rate so that the higher-rate balance is paid off faster and the corresponding higher interest expense is removed. In contrast, if the person 12 is a younger person looking to maximize available spending power, the rules 28 may specify one credit account having a lower recurring payment is to be paid before another credit account having a higher recurring payment so that more funds are available to be spent elsewhere.

At any rate, once the plan defining module 24 produces a list of rules 28 based on the plan 10, the list of rules 28 may be saved and retrieved as appropriate, perhaps in a database or the like (not shown). Note here that for purposes of simplification in connection with the above example it was assumed that the implementation of the rules 28 in the list occurs once a month at the beginning thereof. Nevertheless, the rules 28 in the list may be applied at any appropriate time and the funds for the person 12 as generated may be deposited into any appropriate location without departing from the spirit and scope of the present invention. For example, the list of rules 28 may be applied whenever an expense 16 is received at the plan implementation module 26, and the depositing location may be a savings account or other account of the person 12. Note that such details may be stored with the list of rules 28 or may be found elsewhere.

Note too that the expense 16 may be received at the plan implementation module 26 in any appropriate manner without departing from the spirit and scope of the present invention. For example, the expense 16 may be electronically submitted by the person 12 or directly by the entity to whom the expense 16 is owed. In this regard, the person 12 may employ an expense submission system (not shown) to submit expenses 16 and/or authorize payment thereof. As submitted, it is appreciated that the plan implementation module 26 may pay the expense 16 with the generated funds. In this regard, the plan implementation module 26 may employ an expense payment system (not shown) to pay such submitted expense 16. Such an expense submission system and such an expense payment system are in the nature of a bill-paying system as offered by many financial institutions, are known or should be apparent to the relevant public, and therefore need not be set forth herein in any detail other than that which is provided.

It is to be appreciated that whenever it is determined that the list of rules 28 for a person 12 should be applied to an expense or expenses 16 incurred by or on behalf of the person 12, the implementation module 26 of the tool 22 is actuated. Upon being actuated, then, the implementation module 26 retrieves the list of rules 28 for the person 12 as saved by the plan defining module 24, and applies the retrieved rules 28 sequentially. That is, each rule 28 in the list for the person 12 is in a particular order in the list, and such rules 28 are applied by the implementation module 26 according to such order.

Note here that in applying the rules 28 in the list for a person 12, the implementation module 26 should have access to all necessary accounts or the like of the person 12, and should also be able to effectuate all functions necessitated by the rules 28. Accordingly, if a rule 28 requires that funds be generated by liquidating a particular investment 18 of the person 12, then the implementation module 26 should be able to so access and liquidate such investment 18 of the person 12, or at least forward an appropriate request to do so to another system or even an appropriate officer of a financial institution. Of course, involvement by a human in the process may slow same, but may nevertheless be required in at least some circumstances. At any rate, upon applying each rule 28, it is to be appreciated that an appropriate amount of funds are generated, minus of course any service charge or other necessary charge for doing so. Thus, the implementation module 26 should appropriately account for each transaction performed thereby.

Note that in at least some instances the financial plan 10 of a person 12 should be ignored, perhaps by way of an over-ride or the like. For example, if a large expense 16 of a person 12 is created by the purchase of real estate or the like and is to be offset by the imminent sale of other real estate, such large expense 16 should not be funded by way of anything but short-term investments 18. However, the implementation module 26 of the tool 22 may do otherwise based on appropriate rules 28 for the person 12. Accordingly, such person 12 may override the rules 28 in an appropriate manner, such as for example by submitting the expense 16 with a special notation that is understood by the implementation module 26 and/or the rules 28. Alternatively, it may be that the expense 16 is applied against an account that the implementation module 26 does not consider when applying the rules 28 for the person 12.

It is to be appreciated that other types of over-rides may be handled by the implementation module 26. For example, in addition or as an alternative to ignoring expenses 16, an over-ride may cause the implementation module 26 to handle an expense 16 in a special manner that diverges from the financial plan 10. For example, one such special over-ride may direct the implementation module 26 to liquidate funds for an expense 16 from a long-term investment 18, while another from a specific investment 18 such as a three month government-backed instrument. At any rate, such over-rides may be of any type and be triggered in any appropriate manner without departing from the spirit and scope of the present invention.

Figure 3:
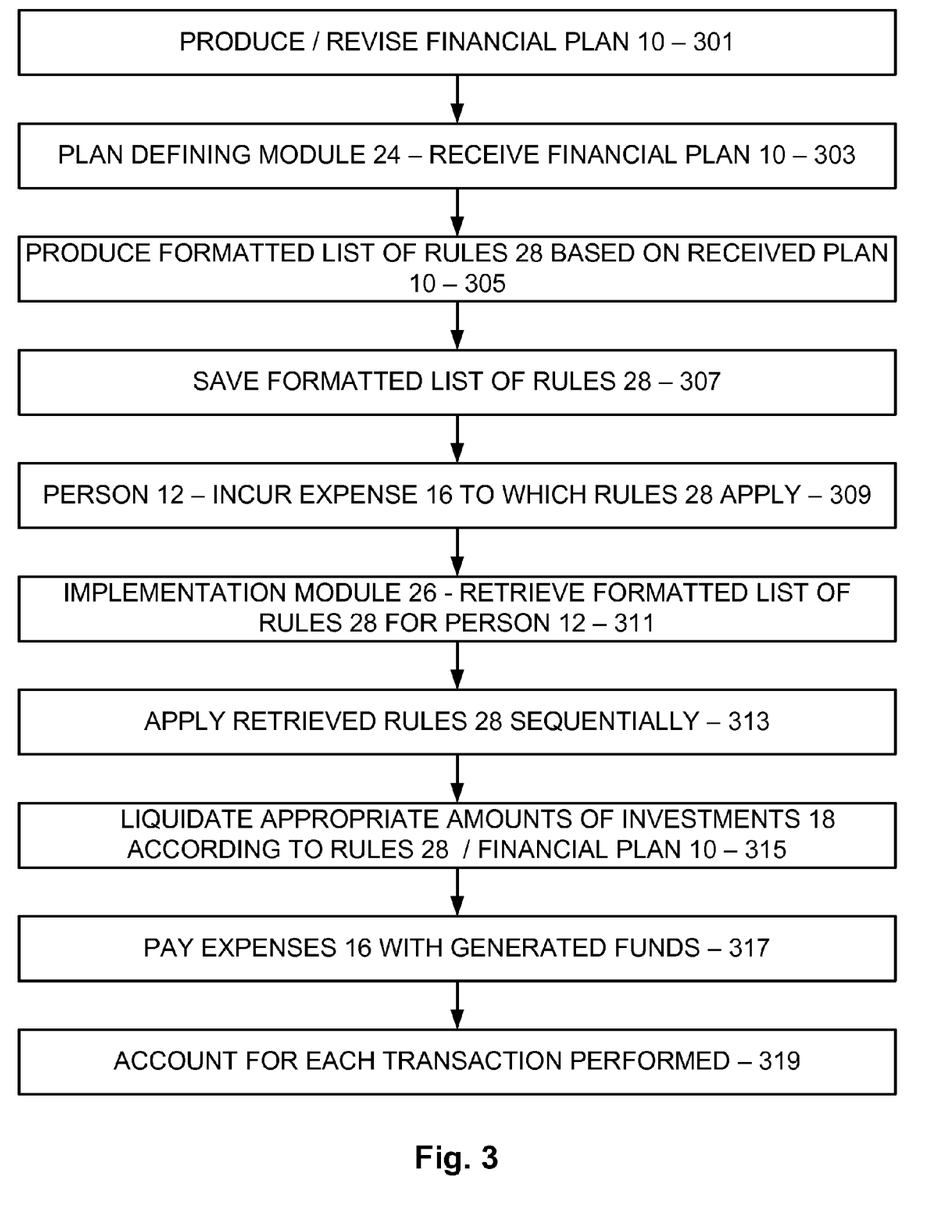
FIG. 3 is a flow diagram showing key steps performed in connection with the system of FIG. 2 in accordance with various embodiments of the present invention.

To summarize, and turning now to FIG. 3, the financial plan implementing tool 22 of the various embodiments of the present invention is generally operated in the following manner. Preliminarily, a person 12 consults with a financial planner or the like and the financial planner produces at least the outlines of a financial plan 10 with regard to expenses 16 or else revises an already produced financial plan 10, or alternatively the person 12 itself produces or revises such a financial plan 10 (step 301). In either case, at some point the tool 22 is instantiated on an appropriate computing device 100, and the plan defining module 24 of the tool 22 is then employed to either receive the financial plan 10 as produced and/or revised elsewhere, or to itself produce/revise such plan 10 (step 303). At any rate, the plan 10 as produced or revised, and particularly the liquidating rules 20 for generating funds from a set of investments 18 of the person 12, is formulated as a list of sequentially applied rules 28, and the plan defining module 24 produces such a list of rules 28 as a formatted output based on the plan 10 (step 305).

The plan defining module 24 upon producing such formatted list of rules 28 then saves same for later retrieval (step 307). In particular, at appropriate times, such as for example upon receiving notification of an expense 16 or at a regularly scheduled time, it is determined that the formatted list of rules 28 for the person 12 should be applied to generate funds to pay expenses 16 incurred by or on behalf of the person 12 (step 309), and the implementation module 26 of the tool 22 is actuated to retrieve the formatted list of rules 28 for the person 12 (step 311), and applies the retrieved rules 28 sequentially (step 313).

Upon applying such rules 28, the implementation module 26 thus liquidates appropriate amounts of investments 18 to generate funds according to the rules 28 which represent the financial plan 10 (step 315), and may in fact pay expenses 16 of the person with such generated funds or forward such generated funds to an expense payment system such as that which was set forth above (step 317). Finally, the implementation module 26 accounts for each transaction performed thereby (step 319).

Note here that although the tool 22 has thus far been set forth herein as including both the plan defining module 24 and the implementation module 26, such modules 24, 26 may be operated separately and the tool 22 may be constructed and instantiated to include only one or the other of the modules 24, 26 without departing from the spirit and scope of the present invention. Such separation may be desirable in the situation where a person 12 may employ the plan defining module 24 to create or revise a financial plan 10 therefor, especially when it is considered that such person 12 may not have any need to access the implementation module 26.

Note too that the tool 22 as set forth herein may be applied to the automatic payment of expenses 16 for most any type of person 12 without departing from the spirit and scope of the present invention. For example, one type of person 12 who may employ the tool 22 is a retired person 12 that has accumulated the investments 18 thereof over a long period of time and intends to draw down such accumulated investments 18 to pay at least some portion of most if not all expenses 16 of such person 12. Similarly, another type of person 12 who may employ the tool 22 is a non-retired person 12 that is still generating income 14 and is obtaining investments 18 therewith but intends to control the manner in which such investments 18 are employed, if at all, to pay at least some expenses 16 of such person 12.

In any case, if the person 12 is not especially disciplined when it comes to following a financial plan 10, the tool 22 imposes such discipline and the plan 10 has a better chance of succeeding. Moreover, in the situation where the options for liquidating investments 18 to generate funds are complicated by varying ancillary costs and regulations associated with such liquidating, the rules 28 derived from the financial plan 10 for the person 12 can take such complications into account and make better choices than the person 12 likely could.

Conclusion

The programming believed necessary to effectuate the processes performed in connection with the various embodiments of the present invention is relatively straight-forward and should be apparent to the relevant programming public. Accordingly, such programming is not attached hereto. Any particular programming, then, may be employed to effectuate the various embodiments of the present invention without departing from the spirit and scope thereof.

In the present invention, systems and methods are provided for implementing a financial plan 10 with regard to expenses 16 of a person 12. Such systems and methods automatically generate funds from appropriate investments 18 and other sources 19 in response to expenses 16 of a person 12 to which such funds are to be applied and based on a produced financial plan 10. The generation of funds is performed according to a series of sequentially applied rules 28 that are derived based on the produced financial plan 10. Thus, the financial plan 10 produced for a person 12 is carried out and the objectives of the person 12 and the financial plan 10 thereof are less likely to fall short of goal due to failure to implement the financial plan 10.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A computer-based method for implementing a financial plan for a person having expenses to be paid according to the financial plan, the financial plan identifying liquidating procedures for liquidating investments to generate funds for the person, the funds for paying the expenses, the method for implementing the financial plan for the person and comprising:

receiving the financial plan at a plan defining module;

producing by a computer processor at the plan defining module based on the received financial plan a formatted list of sequentially applied liquidation rules to liquidate investments that are categorized into groups of investments, wherein the groups of investments are defined by the financial plan;

actuating by a computer processor a plan implementation module upon a triggering event;

receiving the formatted list of rules at the actuated plan implementation module;

applying, at the actuated plan implementation module, the received list of rules by a computer processor to liquidate investments of the person in accordance with the groups of investments and thereby generate the funds for the person; and initiating a liquidation of at least one of the investments of the person based on the application of the received list of rules.

2. The method of claim 1 wherein the plan defining module receives the financial plan as produced at an external location.

3. The method of claim 1 wherein the formatted list of rules is set forth as an eXtensible Markup Language (XML) document that sets forth the rules as a series of conditional steps.

4. The method of claim 1 wherein the plan implementation module is actuated upon a triggering event of an expense of the person being presented.

5. The method of claim 1 wherein the rules of the formatted list of rules are selected from among: a spill-over rule, where an amount of funds is generated from one or more investments and any remainder is left to be generated by a subsequent rule; a split rule, where an amount of funds is generated from among several investments based on a predefined allotment; a conditional rule, where an amount of funds is generated from one or more investments, but only if a condition is met; a fixed amount rule, where the amount of funds generates a specific amount; and combinations thereof.

6. The method of claim 1 wherein each rule in the formatted list for the person is in a particular order in the list and wherein the rules in the list are sequentially applied by the implementation module according to the particular order.

7. The method of claim 1 wherein a rule in the formatted list requires that a particular investment of the person within one of the groups of investments be liquidated, and the plan implementation module one of liquidates such particular investment for the person, forwards a request to liquidate such particular investment to an external computer system, and forwards a request to liquidate such particular investment for execution at a financial institution.

8. A computer-readable medium having stored there-on computer-executable instructions for implementing a computer-based method for implementing a financial plan for a person having expenses to be paid according to the financial plan, the financial plan identifying liquidating procedures for liquidating investments to generate funds for the person, the funds for paying the expenses, the method for implementing the financial plan for the person and comprising:
  receiving the financial plan at a plan defining module;
  producing at the plan defining module based on the received financial plan a formatted list of sequentially applied liquidation rules to liquidate investments that are categorized into groups of investments, wherein the groups of investments are defined by the financial plan;
  actuating a plan implementation module upon a triggering event;
  receiving the formatted list of rules at the actuated plan implementation module;
  applying, at the actuated plan implementation module, the received list of rules to liquidate investments of the person in accordance with the groups of investments and thereby generate the funds for the person; and
  initiating a liquidation of at least one of the investments of the person based on the application of the received list of rules.

9. The medium of claim 8 wherein the plan defining module receives the financial plan as produced at an external location.

10. The medium of claim 8 wherein the formatted list of rules is set forth as an eXtensible Markup Language (XML) document that sets forth the rules as a series of conditional steps.

11. The medium of claim 8 wherein the plan implementation module is actuated upon a triggering event of an expense of the person being presented.

12. The medium of claim 8 wherein the rules of the formatted list of rules are selected from among: a spill-over rule, where an amount of funds is generated from one or more investments and any remainder is left to be generated by a subsequent rule; a split rule, where an amount of funds is generated from among several investments based on a predefined allotment; a conditional rule, where an amount of funds is generated from one or more investments, but only if a condition is met; a fixed amount rule, where the amount of funds generates a specific amount; and combinations thereof.

13. The medium of claim 8 wherein each rule in the formatted list for the person is in a particular order in the list and wherein the rules in the list are sequentially applied by the implementation module according to the particular order.

14. The medium of claim 8 wherein a rule in the formatted list requires that a particular investment of the person within one of the groups of investments be liquidated, and the plan implementation module one of liquidates such particular investment for the person, forwards a request to liquidate such particular investment to an external computer system, and forwards a request to liquidate such particular investment for execution at a financial institution.

15. A computer-based system for implementing a financial plan for a person having expenses to be paid according to the financial plan, the financial plan identifying liquidating procedures for liquidating investments to generate funds for the person, the funds for paying the expenses, the system for implementing the financial plan for the person and comprising:
  a sub-system for receiving the financial plan at a plan defining module;
  a sub-system for producing by a computer processor at the plan defining module based on the received financial plan a formatted list of sequentially applied liquidation rules to liquidate investments that are categorized into groups of investments, wherein the groups of investments are defined by the financial plan;
  a sub-system for actuating by a computer processor a plan implementation module upon a triggering event;
  a sub-system for receiving the formatted list of rules at the actuated plan implementation module; and
  a sub-system for applying, at the actuated plan implementation module, the received list of rules by a computer processor to liquidate investments of the person in accordance with the groups of investments and thereby generate the funds for the person, and initiating a liquidation of at least one of the investments of the person based on the application of the received list of rules.

16. The system of claim 15 wherein the plan defining module receives the financial plan as produced at an external location.

17. The system of claim 15 wherein the formatted list of rules is set forth as an eXtensible Markup Language (XML) document that sets forth the rules as a series of conditional steps.

18. The system of claim 15 wherein the plan implementation module is actuated upon a triggering event of an expense of the person being presented.

19. The system of claim 15 wherein the rules of the formatted list of rules are selected from among: a spill-over rule, where an amount of funds is generated from one or more investments and any remainder is left to be generated by a subsequent rule; a split rule, where an amount of funds is generated from among several investments based on a predefined allotment; a conditional rule, where an amount of funds is generated from one or more investments, but only if a condition is met; a fixed amount rule, where the amount of funds generates a specific amount; and combinations thereof.

20. The system of claim 15 wherein each rule in the formatted list for the person is in a particular order in the list and wherein the rules in the list are sequentially applied by the implementation module according to the particular order.

21. The system of claim 15 wherein a rule in the formatted list requires that a particular investment of the person within one of the groups of investments be liquidated, and the plan implementation module one of liquidates such particular investment for the person, forwards a request to liquidate such particular investment to an external computer system, and forwards a request to liquidate such particular investment for execution at a financial institution.

22. The method of claim 1 further comprising:
- determining by a computer processor at the plan implementation module whether a particular expense includes an over-ride notation indicating that funds for the particular expense be generated by liquidating assets from a different group of assets than a group of assets suggested by the sequentially applied liquidation rules;
- if the particular expense includes the over-ride notation, initiating an asset liquidation in the different group of assets; and
- if the particular expense does not include the over-ride notation, initiating an asset liquidation in the group of assets suggested by the sequentially applied liquidation rules.

23. The medium of claim 8 wherein the actuated plan implementation module is further configured to:
- determine whether a particular expense includes an over-ride notation indicating that funds for the particular expense be generated by liquidating assets from a different group of assets than a group of assets suggested by the sequentially applied liquidation rules;
- if the particular expense includes the over-ride notation, initiate an asset liquidation in the different group of assets; and
- if the particular expense does not include the over-ride notation, initiate an asset liquidation in the group of assets suggested by the sequentially applied liquidation rules.

24. The system of claim 15 wherein the sub-system for applying the received list of rules is further configured to:
- determine whether a particular expense includes an over-ride notation indicating that funds for the particular expense be generated by liquidating assets from a different group of assets than a group of assets suggested by the sequentially applied liquidation rules;
- if the particular expense includes the over-ride notation, initiate an asset liquidation in the different group of assets; and
- if the particular expense does not include the over-ride notation, initiate an asset liquidation in the group of assets suggested by the sequentially applied liquidation rules.

* * * * *